Inventor
ROLAND C. PAGEL
By [signature]
Attorney

Inventor
ROLAND C. PAGEL
By [signature]
Attorney

Inventor
ROLAND C. PAGEL
By Percy P. Lantzy
Attorney

Inventor
ROLAND C. PAGEL
By [signature]
Attorney

United States Patent Office 3,440,614
Patented Apr. 22, 1969

3,440,614

INPUT LINKING DEVICE BETWEEN ANALOG FUNCTIONS AND A NUMERICAL COMPUTER

Roland Camille Pagel, Chatou, France, assignor to International Standard Electric Corporation, New York, N.Y., a corporation of Delaware Filed July 18, 1966, Ser. No. 566,093
Claims priority, application France, Aug. 10, 1965, 27,829
Int. Cl. G11b *13/00*
U.S. Cl. 340—172.5 6 Claims

ABSTRACT OF THE DISCLOSURE

This invention relates to an input linking device for a computer which processes in real time the values of a plurality of time-variable input functions and delivers corresponding output functions. The computer operates in recurrent cycles, each comprising input operations, computing operations and output operations. The cycles are so quick that the output values delivered in each cycle can be smoothed into continuous time-variable output functions which can act again on the input functions (outside the computer) almost as if this action were instantaneous.

Figure 1:
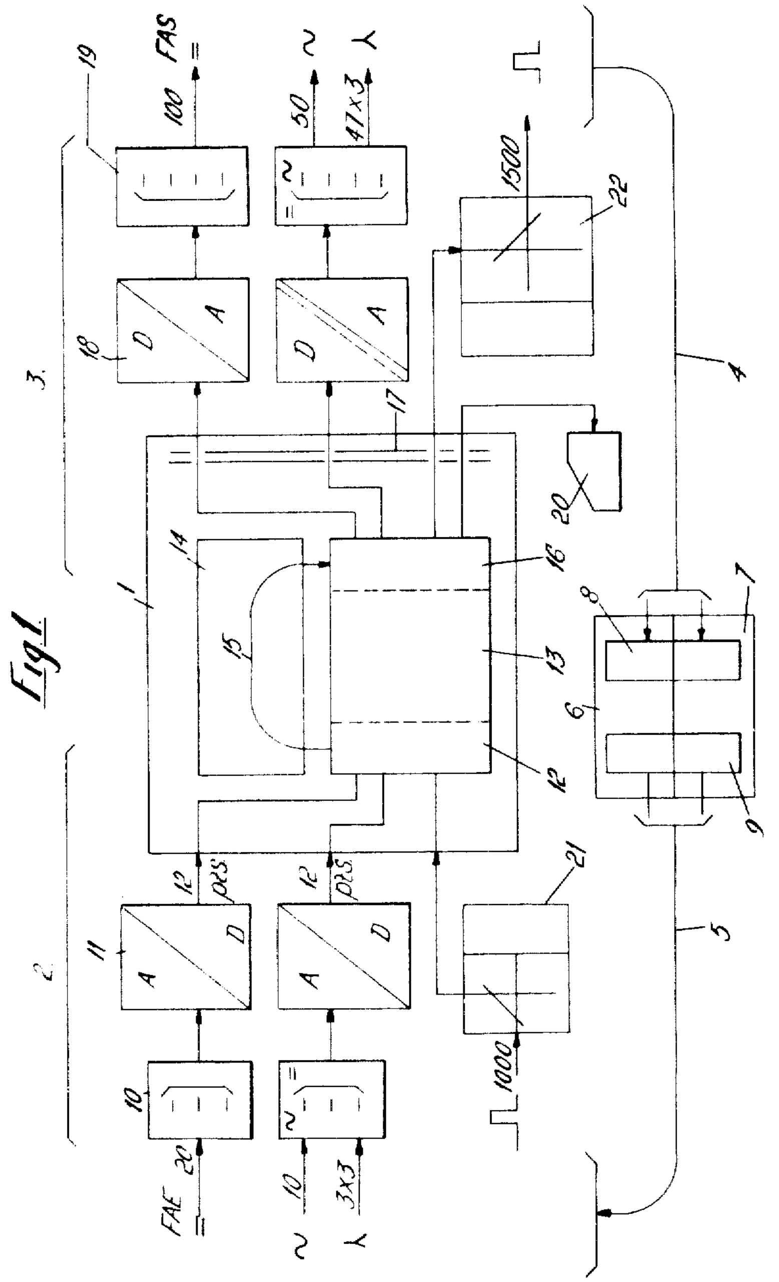

This invention concerns linking devices between analog functions and a numerical computer. It applies, in particular, to flight simulators and concerns, mainly, devices which make it possible to acquire the instantaneous values of a group of variable in time functions, such as flight characteristic functions, to convert them into numerical values and to insert them into a computer within the framework of "true time" operation.

Within the framework of the general programme of a computer which carries out instructions one after the other, the insertion of functions requires suspension of the computing programme. To assure "true time" operation in an installation where the reaction cycle in a loop is fast, as in the case of a flight simulator, it is necessary to shorten the time that the computer must divert from its current programme so as to introduce the functions. The invention makes it possible to reduce this time to the minimum required for this insertion.

In accordance with a characteristic of the invention, the linking device includes an input device with an independent programme to scan successively the analog functions and to convert their instantaneous values into numerical values. This independent programme is started by an order given by the computer in accordance with its general programme. The input device is equipped with means enabling it to mark successively the numerical values of scanned functions, in parallel code, on a transfer system and, every time, to deliver a transfer call signal to the computer. The computer is equipped with means which make it possible to insert each value thus marked in response to each transfer call signal.

In accordance with another characteristic of the invention, the advance module from one function to the next, in the independent programme of the input device, is very much longer than the duration of each transfer, that is to say, for the insertion of a value into the computer, and the general programme of the computer is such that the current programme (computing programme) is only interrupted, in response to each transfer call signal, for the relatively short period required for each transfer.

In accordance with another characteristic of the invention, the input device includes a scanning device of a type where selection of the scanned functions is effected from addresses delivered to this scanning device. The latter cooperates with an address register which receives a first address from the computer with the starting order. The address stored in this register is then automatically advanced, within the scope of the independent programme, after each function has been acquired.

In accordance with another characteristic of the invention, the computer carries an order memory in which one location is allocated to the code of an insertion order with the address of a location in a receiving memory set aside for the linking device. The insertion of each value, in response to a transfer call signal, is effected, in the scope of the general programme, through reference to the said location in the order memory, and the address registered in this location is then advanced with a view to the insertion of the following value in another location of the receiving memory.

According to another characteristic of the invention, the input device is equipped with means which make it possible to mark first, on the transfer system, in a first period of the independent programme, the order code to be introduced mentioned hereabove, with an address which is established according to the first address that the address register has received with the start order; and to send a first transfer call signal to the computer. This first signal is delivered in accordance with a distinct signal mode which will be delivered for the transfer of acquired values. The computer is equipped with means which make it possible to insert this first marking operation, in response to this first signal, in the order memory location mentioned hereabove.

In accordance with another characteristic of the invention, this input device includes a fixed order magazine (wired memory) which gives the order code to be introduced for marking the transfer system as described hereabove, as well as, if necessary, a fixed part of the associated address. It will be noted that this fixed part can designate, in particular, a group or field of memory locations, which is assigned, in the computer, to insert the values of functions (receiving memory).

According to another characteristic of the invention, the input device is equipped with means which make it possible to switch, on the one hand, the transfer call signal, from the first mode, used for transfer of the insertion order, to the second mode, then used to transfer acquired values; and, on the other hand, the transfer system, from its connection with the device which supplies the insertion order code, and, the associated address, to the connection with the output device of the convertor which supplies the numerical values of acquired functions. These means of switching are controlled by a switching order delivered by the computer, after transfer of the insertion order.

According to another characteristic of the invention, the convertor output device includes memory equipment which, in an independent programme, the advance module of which is very much longer than the duration of each transfer, only retains the numerical value of each function for the relatively short period required for each transfer.

Figure 2:
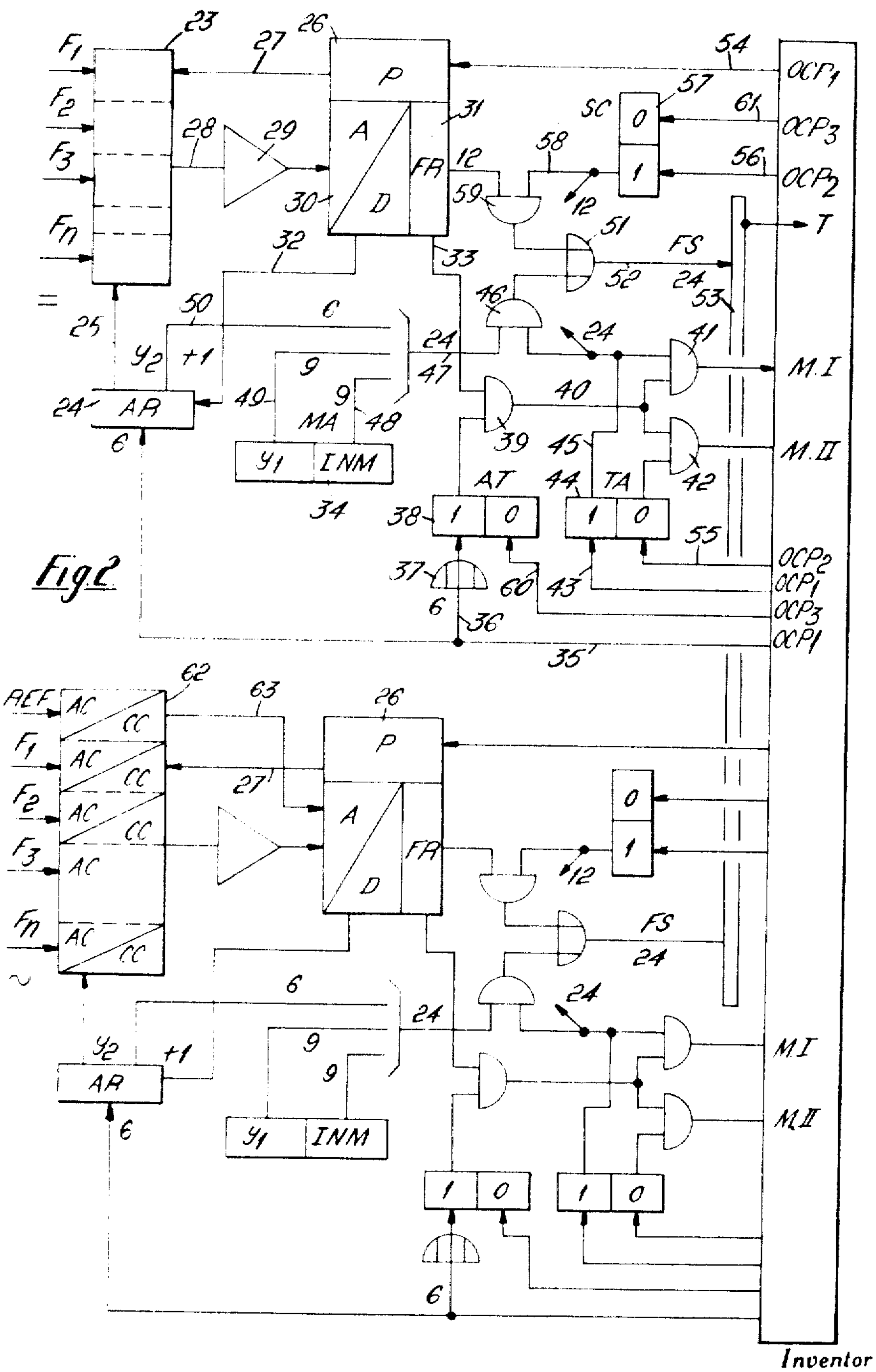
Figure 4A:
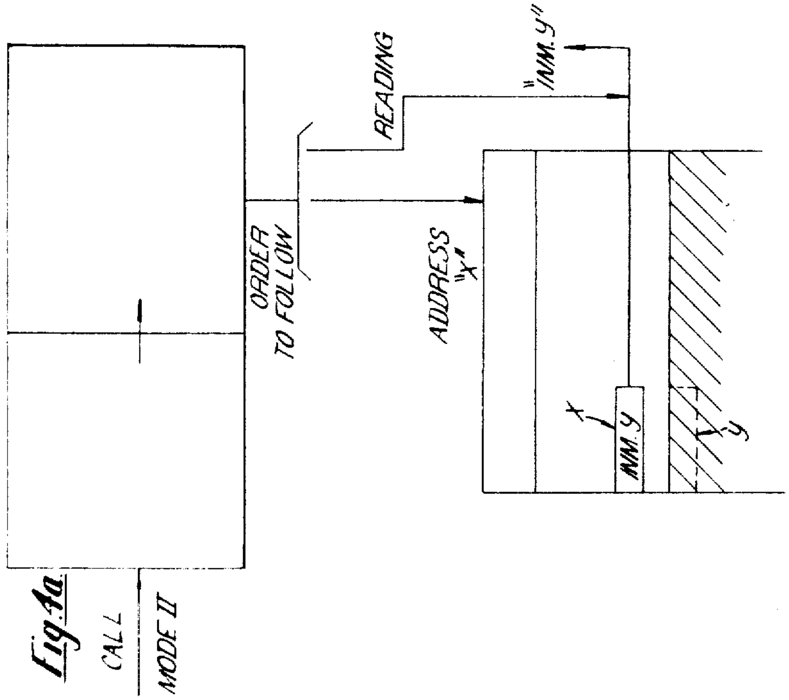
Figure 3:
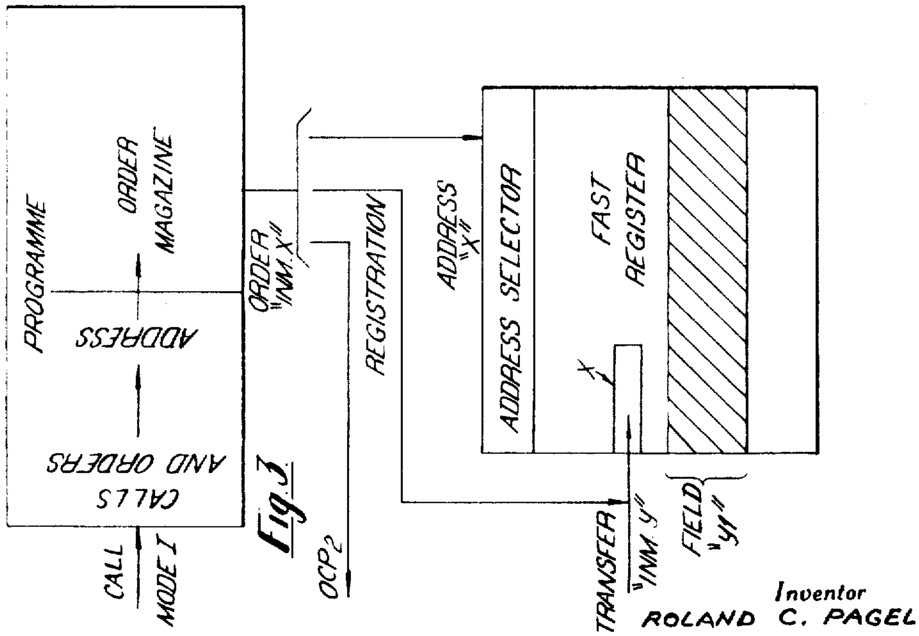
Figure 4C:
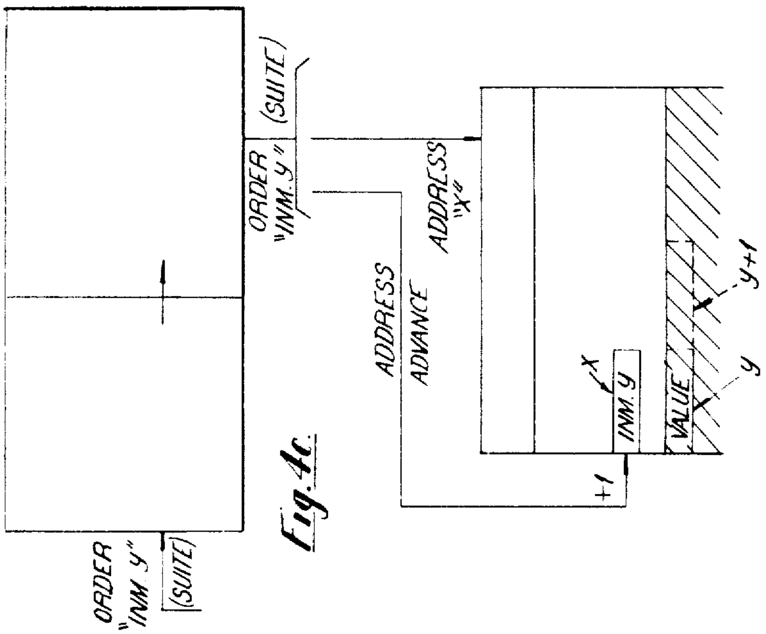
Figure 4B:
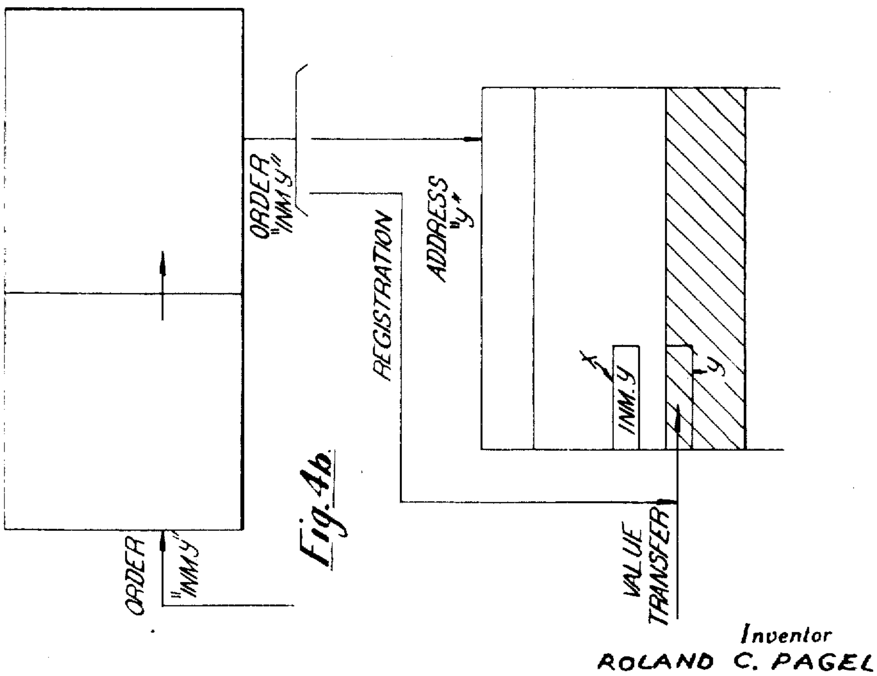

FIGURE 1 shows, for example, an installation which includes linking device in accordance with the invention, FIGURE 2 is the diagram of an input device in accordance with the invention which is the exterior part of an entering linking device, FIGURE 3 illustrates the arrangement and working principle of the interior part of this linking device during the preparation transfer and, FIGURES 4*a*, 4*b* and 4*c* illustrate the working principle of this interior part during the transfer of the value of a function.

The installation shown on FIGURE 1 is mounted in a flight simulator. This consists of a system generating analog functions which vary with time and depend on controls, including the conditions imposed by the instructor, and on each other, in accordance with pre-determined laws and given parameters. A numerical computer 1 is suitably programmed to calculate the values and variation of these functions in true time. It is assumed that this computer is a universal computer such as manufactured by the Computer Control Company and known under the name of "D.D.P. 224." The instantaneous values available of the in-going analog functions FAE are inserted into this computer and the new values of the out-going analog functions FAS are withdrawn. Provision has been made, at input, for 20 direct current analog functions, 10 single-phase, alternating current functions and 3 three-phase current functions. At output provision has been made for 100 direct current analog functions, 50 alternating current functions and 47 three-phase current functions. The computer processes, furthermore, up to 1000 in-coming functions and 1500 out-going functions of Boolean form, which are not concerned by the invention. The means which make it possible to insert these functions into the computer and to withdraw them from it, form the linking device, that is to say, the input linking device 2 and output linking device 3. The return loop is shown at 4–5. It passes through the cockpit 6 and the instructor's point 7, where the pilot and the instructor effect linkage between out-going functions 4, which appear on the instruments onboard 8, and in-going functions 5, which are determined by the controls 9. Passage is effected through the loop in a time which is of the order of 20 to 30 milliseconds from the controls to the instrument panel and passing through the computer. Passage through the linking device must be inserted in this time.

In this installation, this invention concerns the input linking device which processes the analog functions. This device must occupy the computer for as short a time as possible so as to leave it as much time as possible to effect required calculations within the limits imposed by operation in true time. The device, according to the invention, consists of two independent parts, one of which processes the function with direct current and the other the functions with single phase or three phase alternating current (the three phase functions being processed as three single phase functions). These two parts are built in accordance with the same diagram but that part which processes the alternating current, converts the values of the alternating current into direct current values. The main components in this device, shown on FIGURE 1, are, in each part, a scanner-sample taking unit 10 and an analog-digital converter 11. In the computer, the numerical values of in-going functions are registered in a receiving memory 12, which is a field assigned to this use in the fast general register 13 which equips the computer. These are withdrawn from the receiving memory to be processed in the computer itself 14, in accordance with the route shown at 15. The new calculated values will be registered in the out-going memory 16, which is another field in the general memory 13. These will be withdrawn therefrom by passing through a parallel transfer system 17 and converted into analog functions in the digital-analog converters 18 and distributors 19. Certain functions can to be delivered in their numerical form to recording machines 20, such as tele-printers, magnetic tapes, etc. Linkage of the computer with Boolean functions is effected mainly by matrixes or translation grids 21, 22.

A description will be given of an input device in conformity with the invention with reference to FIGURE 2. The top half shows the part which processes functions $F_1$ to $F_n$ shown to be with direct current. The bottom half—which is similar to the top half with the exception of the scanning device as will be shown hereafter—processes other functions $F_1$ to $F_n$, which are shown with alternating current. The narrow block which lies vertically on the right hand side shows the input linking device part which belongs to the computer.

A description will first be made of the part of the linking device which processes the functions shown to be with direct current. Analog functions $F_1$ to $F_n$ are applied on the inputs of a scanning device 23. This device takes samples of the functions which are designated to it each time by an address register 24 (through a connection 25), at moments which are indicated to it by an independent programming unit 26 (through a connection 27). The samples which come out in series at 28, are amplified in amplifier 29 and are applied to an analog-digital converter 30. The numerical values are coded in 12 binary points, the first of which designates the algebraic sign of the analog function. These values are stored in a memory device 31, for a limited time which is of the order of 10 microseconds. Transfer to the computer will be effected within the limits of this time during an operation which will last approximately 8 $\mu$sec., seen from the computer. As soon as the conversion of a sample is completed, the converter delivers a signal at 32 which is applied to address register 24 for the address of the following function to be acquired to be composed therein by adding one unit to the preceding address. At the same time, the converter delivers a ready signal which will be applied to the computer as a transfer call signal. A fixed memory device 34 contains the code for an "INM" transfer order and a part "$Y_1$" of address "Y" which completes this order so as to indicate, in which location of the computer memory it is necessary to transfer the value which will be processed in carrying out this transfer order.

The switching equipment for the input device will be described hereafter with the working principle of this device. At the moment when the insertion of the value of functions into the computer must take place in accordance with the general computer programme, the computer delivers an order $OCP_1$ to the input device, which includes marking on a certain number of lines. The code of a first address, in 6 points, is marked on a set 35 of 6 wires which runs to address register 24. A first address is thus placed in this register designating the function through which the scanning device 23 will start acquisition. A branch 36 of the set of wires 35 runs to an "OR" gate 37, the output of which is connected to input "1" of a flip-flop 38 to place this flip-flop in position "1" whatever the code marked in the set of wires 35. Output "1" of flip-flop 38 is connected to be input of an "AND" gate 39. Output 33 of the convertor is connected to the other input of this gate. The ready signal mentioned hereabove, could thus appear at output 40 of gate 39. This output is connected to an input of two "AND" gates 41 and 42. Order $OCP_1$ also includes marking of a wire 43 which is connected to input "1" of a flip-flop 44 to place it in position "1." The "1" output 45 of flip-flop 44 is connected to the other input of "AND" gate 41 and is multiplied at an input of 24 "AND" gates 46. Through gate 41, the ready signal could be delivered to an input "M.I." of the computer as an address transfer call signal. A system of 24 lines is connected to other inputs of the 24 "AND" gates 46. This set of wires is made up, firstly of a set of 9 wires 48, marked by code "INM," in magazine 34, secondly by a set of 9 wires 49, marked by the code of the first part "$Y_1$" of address "Y," also in magazine 34, and thirdly, by a set of 6 wires 50 marked by the address code in register 24. At this moment, this register contains the first address inserted by the set of wires 35, and which is the second part "$Y_2$" of address "Y." The outputs of the 24 "AND" gates 46 connected to inputs of 24 "OR" gates 51, the outputs of which are connected to a set of 24 wires 52. This set is connected to a transfer set 53 which is connected, furthermore, to a transfer input "T" in the computer. Thus, the complete order "INM.Y" is marked on the transfer set of wires 53. The order $OCP_1$ includes, finally, a start order, the code of which is marked on a set of wires 54 connected to a programming unit 26 of the input device. This order can come in several forms. For example, it is possible to provide for the following: (1) a small acquisition programme affecting a sub-group of five functions (2) a programme affecting all functions, from that which commences to the last ($F_n$), (3) an entire cycle of *n* functions, (4) continuous acquisition until a stop order is received, etc.

Programming unit 26 starts, trips a ready signal on wire 33 and delivers a sample taking signal, on wire 27, to scanning unit 23. The sample is taken from the designated function by the address register which, at this moment, contains the first address which was delivered by the computer. The numerical value of this sample will appear in output memory 31 about 60 microseconds later. The ready signal passes through gates 39 and 41 and is applied to the computer at its input "M.I." This is the call signal for Mode I.

The computer receives this signal, interrupts its current program and transfers information "INM.Y" into a location designated by its general programme the address of which is "X." Information "INM.Y" registered at address "X" is not used for the moment. The computer then delivers an order "$OCP_2$" to the input device. This order marks a wire 55 which is connected to input "0" of flip-flop 44 which returns to its position "0." Output "0" of this flip-flop is connected to an input of "AND" gate 42, the output of which is connected to input "M.II" of the computer. Wire 45 is no longer marked by output "1" of this flip-flop and gates 41 and 46 close. Marking "INM.Y" is cut at gates 46 and no longer reaches gates 51. The ready signal that follows will no longer pass through gate 41 towards input "M.I.," but through gate 42 and towards input "M.II" as a function transfer call signal. Order $OCP_2$ includes, furthermore, marking of a wire 56 connected to input "1" of a flip-flop 57. This flip-flop passes into position "1" and marks its output wire "1" 58 which is multiplied on the inputs in 12 "AND" gates 59. The other inputs of these 12 gates are connected to the 12 output points of magazine 31. The outputs of these gates are connected to the other inputs of 12 of the 24 "OR" gates 51. Marking at 12 points of the numerical value of a sample will pass through gates 59 and 51 and will mark the code of this value on connector system 53. It will be understood that it is not necessary to provide for 24 "OR" gates 51: 12 would suffice to check the code at 12 points; the 12 other points of code "INM.Y" (which is a 24 points code) could mark the 12 wires of system 47 which would be prolonged into 12 wires of system 52, controlled only by 12 (of the 24), gates 46. On the other hand, the first address placed in register 24 can be an address to which is it necessary to add one unit for it to designate the first function to be acquired. In this case, the programme of the input device includes transmission of an addition signal +1 on wire 30 with transmission of the first ready signal on wire 33 which gives the call for Mode I.

When the numerical value of the first function acquired appears in output memory 31, the converter again transmits a ready signal on wire 33. This signal now passes through gates 39 and 42 to be applied at input "M.II" of the computer. Memory 31 retains the numerical value for 10$\mu$sec., by marking it on transfer system 53 through the 12 gates 59 and 12 of 24 gates 51 (or the 12 gates 51 in the case where there are only 12).

In answer to the call for Mode II, the computer again interrupts its current programme to effect transfer of the numerical value of the function acquired. To effect this transfer, it refers to address "X" in its memory, where it finds order "INM.Y" transferred at the beginning. It executes this order and registers the value marked on the transfer system at address "Y" of its memory, that is to say, in location "$Y_2$" of memory field "$Y_1$." Then, it adds +1 to address "Y" registered in the location with address "X," with a view to the next transfer. More exactly, it adds +1 to the address of location "$Y_2$," in the same field "$Y_1$." All this takes place in 8$\mu$sec., after which the computer returns to its current program.

The 10$\mu$sec. of exposure having elapsed, the input device acquires the next function by taking a sample and converting it into a numerical value 60$\mu$sec. are allotted to these operations in the input device programme. The numerical value will again be exposed for 10$\mu$sec., with transmission of a call Mode II and addition +1 in address register 24. This value will be transferred again by reference to address "X" where transfer order "INM.Y+1" is to be found, and so on. At the end of acquisition, the computer will deliver an order $OCP_3$ which will reset flip-flops 44 and 57 at zero over wires 60 and 61.

In the part of the input device which processes the alternating current functions, the scanning device 62 is different from the scanning device 23 which processes the direct current functions. It is assumed that the alternating current functions are expressed by an amplitude modulation of a carrier current at 400 c./s. Additional input equipment in device 62 receives a reference current REF which is the nonmodulated carrier current. This equipment delivers a pulse to the converter at each cycle of the carrier current along wire 63 for sychronization and comparison of amplitude. The sample taking pulses are sent by the programmer 26 to scanning device 62 at moments when the carrier current passes these peaks. The direct current samples thus attained are compared, as to amplitude, in the converter, with the amplitude of the carrier current and the differences are coded in numerical values. The remainder of the circuits is similar to the circuits described hereabove.

The operation which takes place in the computer will be again described with reference to FIGURES 3, 4*a*, 4*b* and 4*c* which briefly show the computer components which take part in this operation. By referring to FIGURE 3, these components are essentially a programming device and a fast register. The programming device consists of an access device in which the calls are registered, together with orders and other information including sequency information, which determine successive orders in the program, that is to say, which form the addresses of these orders. The programming device includes, furthermore, an order magazine which delivers the addressed orders. These orders include, generally, a certain number of orders delivered to various components in the computer, in parallel or in sequence, for them to carry out the elementary operations including progression of the program. The memory shown is a rapid register containing a large number of binary words (in this case, 24 points in each) and equipped with an address selector to register or read words at the addresses indicated to the address selector. It can be assume that reading erases the word and that it is accompanied by re-registration when the word must be retained in the memory.

FIGURE 3 shows the operations engendered by the call for Mode I received from the input device on FIGURE 2. This call is inserted in the access device of the programme device and suitably noted. In combination with all the information which is registered, on the other hand, this call is converted into an address which is delivered to the order magazine. The magazine delivers an order which includes an address "X" (defined in the stored program), a registration order and an order "$OCP_2$" as mentioned hereabove. In execution of this order, binary information "INM.Y" marked on the transfer system, FIGURE 2, is registered at address "X" in the computer memory.

FIGURES 4*a*, 4*b*, and 4*c* illustrate three stages of the operations engendered by a call for Mode II. Referring to FIGURE 4*a*, call Mode II is applied to the programme access device and first provokes transmission of an order which contains address "X" and a reading order (with re-registration). In execution of this order, information "INM.Y" is read at address "X" so as to be delivered to the programming device. Referring to FIGURE 4*b* this information is applied, as a memory storage order, to the programme access device. It engenders the transmission of an order to follow, which contains address "Y" and a registration order. In execution of this order, the binary value of the function which has been acquired, which is marked on transfer system 53, FIGURE 2, is registered at address "Y" in the memory. The remainder of this order, illustrated on FIGURE 4*c*, again includes address "X" and an address advance order (addition+1). In execution of this order, information "INM.Y" registered at address "X" becomes: "INM.Y+1." The next binary value will thus be transferred to address "Y+1," that is to say, in the location which follows location "Y" in the input memory and so on.

Of course, this transfer programme can be effected by methods which are well-known in this technology, according to the structure and arrangement of the various components of the numerical computer used.

In a practical example, this programme takes up the following times seen from the computer:

(1) Approximately 2 μsec. for the first current programme interruption and transmission of order $OCP_1$;

(2) Approximately 13 μsec. according to the independent programme of the input device in application and execution of this order, waiting time for call Mode I, address transfer and order $OCP_2$;

(3) 60 μsec., that the input device programme allocates to the acquisition of a function with conversion to a binary value, with the computer resuming, during this period, the current programme;

(4) 10 μsec., that the input device programme allocates for exhibition of the binary value, with the computer interrupting its current programme for 8 μsec. (with a tolerance of 2 μsec.), to effect transfer of the binary value and this, for as many times as there are functions to be acquired;

(5) An unspecified time period for end of acquisition (this time is nil in the case where the independent programme, of the input device stops acquisition after scanning a certain number of functions).

Thus, in a 20 function acquisition programme which lasts for $20\times(60+10)=1400$ μsec., the computer is only occupied for $20\times8=160$ μsec. $1400-160=1240$ μsec. are left free, during which the computer continues with its current programme.

It must be understood that the special description of a practical example which has been given hereabove is in no way limiting and that the invention can be applied with many other variations without exceeding its scope.

I claim:

1. In an arrangement comprising a digital computer operating in real time and in cycles of a recurrent computing program on data from samples of a plurality of time-variable input functions, an input linking device including:

a scanning device for scanning said input functions;

a converter coupled to said device for converting said input functions from analog to digital;

an individual programming unit which is coupled to be started by said computer during each of its cycles and to control the scanning of said scanning device;

transfer means coupled to said computer;

means coupled to said converter for marking successively the numerical values of the scanned functions, in a parallel code, on said transfer means and for sending a transfer call signal to said computer;

said computer including means for inserting each value thus marked in response to each transfer call signal; and said individual programming unit including an advance module whose function handling duration is longer than the duration of the introduction of the value into the computer, whereby, the current part of the recurrent computing program is only interrupted in response to each transfer call for introduction of the value.

2. The input linking device of claim 1 including a memory device coupled to said converter for maintaining the numerical value of each function for the time period required for insertion into the computer.

3. The input linking device of claim 2, including an address register coupled to receive a first address from the computer with a starting order, said address is stored in said address register automatically after the acquisition of each function; and said scanning device including means coupled for function selection in accordance with said address.

4. The input linking device of claim 3, wherein said computer includes a receiving memory having an order memory location which contains an order insertion code with the address of its location, the introduction of each value into said computer receiving memory, in response to a transfer call, is effected in reference to said order memory location, and the address registered in this location is advanced by one for introduction of the next value into another location in said receiving memory.

5. The input linking device of claim 4, including:

means coupled for marking on said transfer means said order insertion code with the first address received with said starting order and coupled for delivery to said computer a first transfer signal indicating an advance request for transfer of function values;

said computer having means for marking said first transfer signal into said order memory location; and a fixed memory which is coupled to supply the order code to be inserted in said order memory location.

6. The input linking device of claim 5 including:

switching means to switch said transfer call signal from said advance request signal to a transfer request signal for transfer of values of functions, and to switch said transfer means to the output of said converter; and said switching means being responsive to a switching order from said computer after the transfer into the order memory location of said insertion order.

References Cited

UNITED STATES PATENTS

| | | | |
|---|---|---|---|
| 3,372,381 | 3/1968 | Raspanti | 340—172.5 |
| 3,361,897 | 1/1968 | Rush | 235—150.21 |
| 3,341,697 | 9/1967 | Kaufman et al. | 235—184 |
| 3,299,197 | 1/1967 | Cutler | 35—10.2 |
| 3,284,616 | 11/1966 | Ernyei et al. | 235—150.5 |
| 3,270,321 | 8/1966 | Berkowitz | 340—147 |
| 3,225,333 | 12/1965 | Vinal | 340—172.5 |
| 3,083,473 | 4/1963 | Luton | 35—12 |
| 3,059,228 | 10/1962 | Beck et al. | 340—179 |

GARETH D. SHAW, *Primary Examiner.*

U.S. Cl. X.R.

235—150.1